Patented Jan. 12, 1937

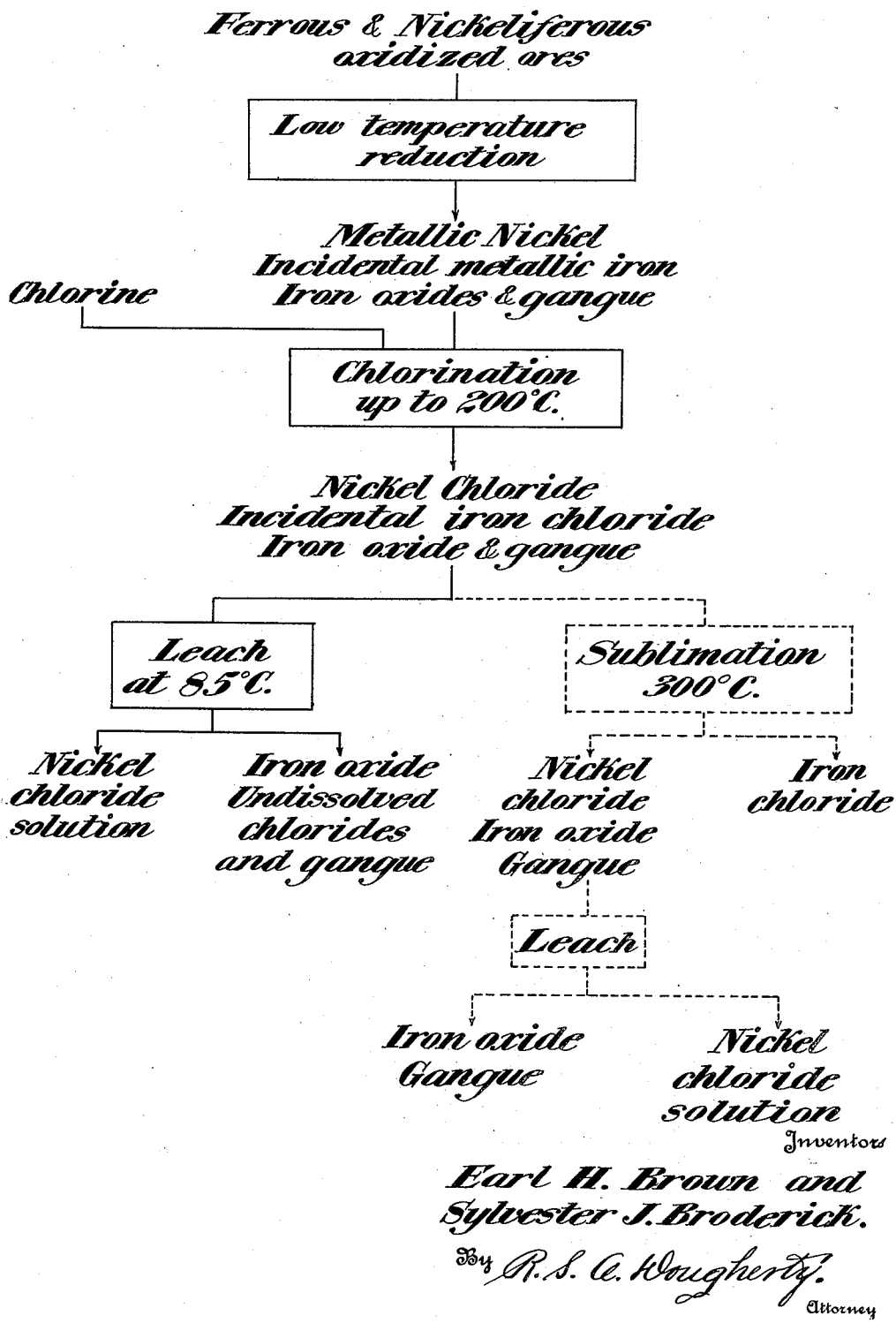

2,067,874

UNITED STATES PATENT OFFICE 2,067,874

TREATMENT OF IRON ORES CONTAINING NICKEL

Earl H. Brown and Sylvester James Broderick, Yellow Springs, Ohio, assignors to Bethlehem Mines Corporation, a corporation of Delaware Application August 29, 1932, Serial No. 630,907

11 Claims. (Cl. 75—111)

This invention relates to the treatment of complex iron ores, which contain nickel as an intimately associated minor constituent, in the form of oxide or silicate. Such ores, when smelted in a blast furnace, result in the complete reduction of the nickel with the iron and its consequent inclusion in the pig iron, as an alloying component. The presence of nickel is not required in ordinary commercial grades of steel and it is therefore desirable to effect its removal to a substantial degree, prior to charging the ore to the blast furnace.

The present invention is directed to the conversion of reduced or metallized nickel, derived from the ore, to a soluble form such as nickel chloride, without involving any serious loss of the iron, with which it is associated. The method to be disclosed, provides for the removal of all but a trace of nickel with a loss in iron of only 5% or less.

The drawing shows a flow sheet of the process disclosed in this application.

In order to render the nickel in its mineralogical form, susceptible to chlorination, it must first be reduced to a metallic condition. To avoid a complete reduction of the ore, such as would obtain under ordinary smelting conditions, the desired result may be best obtained by reduction at low temperatures, that is to say, below the fusion point of the ore. As already known the low temperature reduction of Mayari ore, may result in the reduction of all the nickel and the greater part of the iron, the chromium remaining unreduced.

Various methods of low temperature reduction have been contemplated for this ore and it has been found that hydrogen or a hydrogen containing gas is particularly effective and permits of the desired degree of reduction at substantially low temperature. Carbon monoxide which is also an efficient reducing agent requires a somewhat wider range of temperature for reduction. However when using hydrogen as the reducing agent at temperatures ranging from 600° C. to 700° C. a comparatively quick reduction of nickel is effected, while the iron is only reduced in part. For example at 600° C. 91.8% of the nickel may be reduced, but only 13.4% of the iron. As the temperature is increased the proportion of iron that is reduced is also substantially greater and, for the purpose in view, it is desirable to keep the reduced iron as low as practicable.

In order to separate the reduced from the unreduced portion of an ore that has been treated by low temperature reduction, it has been customary to submit the mass discharged from the reduction furnace to magnetic separation or to operations well known in ore dressing. In the present case, the presence of partially reduced iron ore makes a clean separation of a metallized portion difficult.

Another method is to heat the mass to fusion and effect a separation of metal from gangue or slag by liquation. With the larger proportion of the iron oxide unreduced, such a method is clearly impracticable in the present case. On the other hand if the initial reduction were carried out under conditions that would insure reduction of a major portion of the iron as well as the nickel, the result of fusion would be to alloy the nickel and iron, a result it is specifically desired to avoid.

An important feature of this invention is therefore the removal, by chemical treatment, of the metallized portion of the ore from that unreduced; and it has been found that chlorination to render soluble the metallized portion offers an effective method of removal. Any of the known chlorinating agents may be used, but chlorine gas, because of its comparative ease of control, is the preferred medium.

When using chlorine a temperature of about 200° C. has been found to give satisfactory results. At higher temperatures the nickel extractable by water leaching is decreased, and the soluble iron tends to increase; whereas at room temperature the results do not greatly vary from those obtained at 200° C. The time required for chlorination depends somewhat on the physical condition of the ore after its initial reduction, the average particle size of the product and the quantity under treatment for any predetermined flow of gas. At 200° C. for any specified condition of the ore, there is an optimum time for best extraction of nickel and least loss of iron, the exact determination of which is best determined experimentally in the actual apparatus for chlorination. However comparing the time taken for reduction at 600° C. and that for chlorination at 200° C., it may be said that the first named gives best results with a comparatively short exposure to the reducing gas, whereas chlorination proceeds more slowly. Under the conditions ruling in various experimental runs, it has been found that the time for chlorination may well be extended to periods four times the duration of the reduction phase.

For the removal of the soluble nickel chloride any of the known methods of leaching with water, continuous counter current decantation for example, may be utilized. Advantage may be taken of the decreased solubility of ferric chloride in hot water at about 85° C. or just below the boiling point as compared with its solubility at normal temperature; the solubility of the nickel chloride remaining practically unaffected. In this manner substantially the whole of the soluble nickel may be leached from the mass and about half of the soluble iron. The residue therefore contains only a very small proportion of the original nickel (less than 10%), together with 80% or more of the original iron as oxide and a small proportion of unleached ferric chloride; under optimum conditions the iron loss in the leach solution may be limited to about 5%. This residue after drying and agglomeration by sintering is suitable for smelting in a blast furnace and will result in a pig iron, in which the nickel content has been reduced to a trace.

Moreover, by following the above methods of reduction without fusion, followed by chlorination, an alternative method of removing chlorinated nickel with minimum removal of iron may be used. It has been found that by raising the temperature of the chlorinated mass, after chlorination has been effected to the desired degree, to about 300° C., an effective separation of the ferric chloride from the nickel chloride by sublimation of the former may be attained. To prevent any reversal of the chlorine reaction at the higher temperature, it has been found advantageous to maintain the flow of chlorine during the period of sublimation. As indicated in a previous paragraph, presence of chlorine at a temperature above 200° C. tends to increase the amount of iron chloridized, however at 300° C. the greater part of the ferric chloride formed sublimes and may be recovered in or near the gas outlet of the apparatus, or in suitable condensing means provided therefor. In this manner the actual loss of iron in leaching may be decreased to 2% or less of the original iron in the untreated ore and practically all the nickel may be removed.

From the above it can be seen that nickel may be effectively removed from an iron ore, in which it exists as an impurity by the combination of preferential reduction, preferential conversion to soluble form and preferential removal from the zone of conversion. While the process steps have been principally directed to a specific case of a nickeliferous iron ore, it will be evident to one skilled in the art, that the several steps disclosed are individually susceptible to adjustment in respect to temperature and time of treatment according to the condition of the ore and the proportion of nickel it contains.

The specific features of the invention are set forth in the following claims.

We claim:

1. A process for the treatment of nickeliferous iron ores, which consists in effecting a selective low temperature reduction of the ore under conditions favoring complete reduction of the nickel without substantial reduction of the iron, chlorinating the reduced nickel and iron at a temperature favorable to a complete conversion of the reduced nickel to soluble chloride and some conversion of the reduced iron to chloride, and leaching the product of chlorination with hot water at a temperature at which the solubility of iron chloride is a minimum but the high solubility of nickel chloride is unaffected.

2. A process for the treatment of nickeliferous iron ores, which consists in effecting a selective low temperature reduction of the ore under conditions favoring complete reduction of the nickel without substantial reduction of the iron, chlorinating the reduced nickel and iron at a temperature not exceeding about 200° C., and leaching the product of chlorination with water at a temperature slightly below its boiling point, to preferentially remove nickel chloride from the mass.

3. A process for the treatment of nickeliferous iron ores, which consists in, effecting a selective low temperature reduction of the ore to metallic nickel at a temperature below 800° C. by means of a reducing gas, chlorinating the metallized product of reduction at a temperature not exceeding about 200° C. and leaching the chlorinated mass so as to remove the soluble chlorides.

4. A process for the treatment of nickeliferous iron ores, which consists in, reducing the ore to metallic nickel with gas containing hydrogen at a temperature below 800° C., chlorinating the metallized product of reduction at a temperature not exceeding about 200° C. and leaching the chlorinated mass so as to remove the soluble chlorides.

5. A process for the treatment of nickeliferous iron ores, which consists in, reducing the ore to metallic nickel with hydrogen gas at about 600° C., chlorinating the metallized product of reduction at a temperature not exceeding about 200° C. and leaching the chlorinated mass so as to remove the soluble chlorides.

6. A process for the treatment of nickeliferous iron ores, which consists in, submitting the ore to low temperature reduction under conditions to metallize all the nickel and only a minor portion of the iron, chlorinating the reduced nickel and iron at substantially low roasting temperature, and raising the temperature of the roast after full chlorination of the nickel has been effected, so as to volatilize and sublimate the iron chloride, said increase in temperature being applied while maintaining a flow of chlorinating gas over the mass, and after sublimation of the iron chloride, removing the soluble nickel chloride by leaching.

7. A process for the treatment of nickeliferous iron ores, which consists in, submitting the ore to low temperature reduction under conditions to metallize all the nickel and only a minor portion of the iron, chlorinating the reduced nickel and iron at a temperature not exceeding 200° C. until substantially complete conversion of the nickel to nickel chloride has been effected, raising the temperature to about 300° C. while maintaining a flow of chlorine over the roast, until the iron chloride has been volatilized and sublimated to a substantial degree, and leaching the roast to remove the soluble nickel chloride.

8. A process for the treatment of nickeliferous iron ores, which consists in, selectively reducing to metal the nickel and a minor part of the iron at a temperature substantially below the fusion point of the ore, selectively chloridizing the reduced nickel to a soluble salt, and removing by leaching the nickel chloride and any incidental ferric chloride formed.

9. A process for the treatment of nickeliferous iron ores, which consists in, selectively reducing to metal the nickel and a minor part of the iron at a temperature substantially below the fusion point of the ore, selectively chloridizing the reduced nickel to a soluble salt, subliming any incidental ferric chloride formed, and removing the nickel chloride by leaching.

10. A process for removing nickel from a nickeliferous iron ore which consists in deoxidizing the nickel ore to finely divided sponge nickel containing metallic iron as an impurity, cooling the sponge to normal temperature, converting the sponge nickel to nickel chloride and the metallic iron to ferric chloride by treatment with chlorine gas at temperature not exceeding about 200° C., and leaching the chlorinated mass at about 80° C. to remove the nickel chloride preferentially to the ferric chloride in said mass.

11. A process for removing nickel from a nickeliferous iron ore which consists in deoxidizing the nickel ore to finely divided sponge nickel containing metallic iron as an impurity, cooling the sponge to normal temperature, converting the sponge nickel to nickel chloride and the metallic iron to ferric chloride by treatment with chlorine gas at temperature not exceeding about 200° C., raising the temperature to about 300° C. to volatilize the ferric chloride and leaching the nickel chloride from the residual ore.

EARL H. BROWN.
S. JAMES BRODERICK.